US008938942B2

(12) United States Patent
Kaiho et al.

(10) Patent No.: US 8,938,942 B2

(45) Date of Patent: Jan. 27, 2015

(54) EXTERNAL-COMBUSTION, CLOSED-CYCLE THERMAL ENGINE

(75) Inventors: Toshimitsu Kaiho, Tokyo (JP); Shouzou Tsuruno, Yokosuka (JP); Souhei Sekine, Yokosuka (JP); Kenjirou Kusu, Anjou (JP)

(73) Assignee: Yokohama Seiki Co., Ltd., Yokosuka-Shi (JP)

( * ) Notice: Subject to any disclaimer, the term of this patent is extended or adjusted under 35 U.S.C. 154(b) by 207 days.

(21) Appl. No.: 13/699,595

(22) PCT Filed: Jun. 1, 2010

(86) PCT No.: PCT/JP2010/059228

§ 371 (c)(1), (2), (4) Date: Dec. 21, 2012

(87) PCT Pub. No.: WO2011/151888

PCT Pub. Date: Dec. 8, 2011

(65) Prior Publication Data

US 2013/0174532 A1 Jul. 11, 2013

(51) Int. Cl.

| | |
|---|---|
| ***F02C 5/00*** | (2006.01) |
| ***F01B 29/10*** | (2006.01) |
| ***F02G 1/043*** | (2006.01) |

(52) U.S. Cl.

CPC ............ *F02G 1/043* (2013.01); *F02G 2242/32* (2013.01)

USPC .................. 60/39.6; 60/521; 60/522; 60/524

(58) Field of Classification Search

CPC ............................. F02G 1/043; F02G 2242/32

USPC .......................................... 60/39.6, 517–526

See application file for complete search history.

(56) References Cited

U.S. PATENT DOCUMENTS

| | | | | |
|---|---|---|---|---|
| 3,751,904 A * | 8/1973 | Rydberg | ......................... | 60/525 |
| 3,767,325 A * | 10/1973 | Schuman | ...................... | 417/207 |
| 4,327,550 A * | 5/1982 | Knoos | ............................ | 60/522 |

(Continued)

FOREIGN PATENT DOCUMENTS

| | | |
|---|---|---|
| JP | 1981-167760 U | 12/1981 |
| JP | S61-500272 A | 2/1986 |
| JP | 2000-265853 A | 9/2000 |

(Continued)

OTHER PUBLICATIONS

A Notification of First Office Action with Search Report issued by the State Intellectual Property Office of China, mailed May 14, 2014, for Chinese counterpart application No. 2010800067011.1.

*Primary Examiner* — Hoang Nguyen

(74) *Attorney, Agent, or Firm* — Law Office of Katsuhiro Arai

(57) ABSTRACT

An external-combustion, closed-cycle thermal engine is provided with: a gas chamber, a heater, and a cooler which are closed; flow paths for connecting the gas chamber and the inlet and outlet sides of the heater; flow paths for connecting the gas chamber and the inlet and outlet sides of the cooler; on-off valves respectively provided to the flow paths on the inlet and outlet sides of the heater and of the cooler; and a means for moving a working gas. The switching of the destination of the working gas between the heater and the cooler is performed by the on-off valves, and an operation body is driven. As a result of the configuration, the volume of the heater or the cooler does not affect the efficiency of the engine, and the engine operates under various conditions.

9 Claims, 8 Drawing Sheets

(56) References Cited

U.S. PATENT DOCUMENTS

| | | | | |
|---|---|---|---|---|
| 4,367,625 | A | 1/1983 | Vitale | |
| 4,622,813 | A | 11/1986 | Mitchell | |
| 6,470,683 | B1 * | 10/2002 | Childs et al. | 60/641.8 |
| 7,603,858 | B2 * | 10/2009 | Bennett | 60/517 |

FOREIGN PATENT DOCUMENTS

| | | | |
|---|---|---|---|
| JP | 2006-275018 | A | 10/2006 |

* cited by examiner

EXTERNAL-COMBUSTION, CLOSED-CYCLE THERMAL ENGINE

This application is the U.S. National Phase under 35 U.S.C. §371 of International Application PCT/JP2010/059228, filed Jun. 1, 2010. The International Application was published under PCT Article 21(2) in a language other than English.

TECHNICAL FIELD

The present invention relates to an external-combustion, closed-cycle thermal engine having a simple structure and allowing for easy operation and maintenance.

PRIOR ART

The Stirling engine, which is quiet and low-pollution and allows for effective utilization of otherwise wasted energy regardless of the type of heat source, is an external-combustion thermal engine which is recognized as a prominent thermal engine for the future, and under which category various types of engines are being researched and developed.

The Stirling engine obtains motive power by heating and cooling the working gas filled in the gas chamber to cause the gas to expand and contract.

The conventional displacer-type Stirling engine obtains motive power by heating and cooling the working gas moved back and forth between the heating part and cooling part by means of the displacer, to cause the gas to expand and contract, and thereby operate a power piston. The displacer is constituted to operate in conjunction with the power piston with a phase.

The conventional Stirling engines are classified into three types—$\alpha$, $\beta$, and $\gamma$—depending on the layout of pistons, cylinders, etc. Operations of these three types of engines are described in detail in Patent Literature 1.

With the aforementioned conventional Stirling engines, however, working gas is simultaneously compressed and decompressed in the gas chamber, heater and cooler. To be specific, working gas in the cooler must also be compressed to compress the gas chamber in the heating period, and working gas in the heater must also be decompressed to decompress the gas chamber in the cooling period. For this reason, the volume of the heater or cooler becomes larger relative to the volume of the gas chamber, which reduces the engine efficiency. Accordingly, the heater and cooler must be made smaller to raise the engine efficiency.

However, operating the engine requires that the necessary amount of heat be taken in and exhausted, for which the heater and cooler must have sufficient capacities. To make the heater smaller but still provide sufficient capacity, the thickness can be reduced or the heating temperature can be raised to increase the amount of heat conducted per unit area. However, these measures require precision work and adoption of expensive heat-resistant metal and present a problem of promoted corrosion of the heater due to high temperature.

In addition, the heater is not used in the cooling period, which results in a lower heater efficiency over the entire period, and because the external heat added to the heater is wasted, the utilization efficiency drops. The same goes with the cooler in the heating period.

PRIOR ART LITERATURE

Patent Literature

Patent Literature 1: Japanese Patent Laid-open No. 2006-275018

SUMMARY OF THE INVENTION

Problems to Be Solved by the Invention

In light of the conventional technology mentioned above, the object of the present invention is to provide an external-combustion, closed-cycle thermal engine whose heater or cooler volume does not affect engine efficiency and which can be designed and produced under various conditions.

Means for Solving the Problems

The invention according to Embodiment 1 realizes an external-combustion, closed-cycle thermal engine whose heater or cooler volume does not affect engine efficiency and which can be designed and produced under various conditions, wherein such engine comprises:

a sealed gas chamber, a heater and a cooler;

flow paths connecting the gas chamber and an inlet side and outlet side of the heater;

flow paths connecting the gas chamber and an inlet side and outlet side of the cooler;

on-off valves respectively provided in the flow paths on the inlet sides and outlet sides of the heater and cooler; and a means for moving a working gas;

wherein such engine is characterized in that:

the on-off valves on the inlet side and outlet side of the cooler are closed to seal the cooler and the on-off valves on the inlet side and outlet side of the heater are opened to circulate the working gas in the gas chamber through the heater in order to heat the working gas in the gas chamber, or the on-off valves on the inlet side and outlet side of the heater are closed to seal the heater and the on-off valves on the inlet side and outlet side of the cooler are opened to circulate the working gas in the gas chamber through the cooler in order to cool the working gas in the gas chamber, thereby causing the working gas in the gas chamber to expand or contract to drive an operation body.

The invention according to Embodiment 2 is an external-combustion, closed-cycle thermal engine according to Embodiment 1, characterized in that the on-off valves are three-way valves. A three-way valve is defined as a switching valve having three branched flow paths to allow for selective connection of a fluid body entering from one branch to one of the remaining two branched flow paths, or selection of one of two branched flow paths to be connected to the remaining flow path.

The invention according to Embodiment 3 is an external-combustion, closed-cycle thermal engine according to Embodiment 1, characterized in that the on-off valves provided in the flow path connecting the gas chamber to the inlet side of the heater and flow path connecting the outlet side of the cooler to the gas chamber, are check valves.

The invention according to Embodiment 4 is an external-combustion, closed-cycle thermal engine according to any one of Embodiments 1 to 3, characterized in that the operation body is a piston. If the operation body is a piston, the gas chamber is defined as a cylinder and multiple gas chambers as multiple cylinders.

The invention according to Embodiment 5 is an external-combustion, closed-cycle thermal engine according to any one of Embodiments 1 to 3, characterized in that the operation body is a reciprocal flow turbine. A reciprocal flow turbine is a device that generates rotational torque in the same direction even when the flow direction of working gas reverses.

The invention according to Embodiment 6 is an external-combustion, closed-cycle thermal engine according to any one of Embodiments 1 to 5, characterized in that multiple sealed gas chambers and operation bodies are provided to share the heater and cooler.

The invention according to Embodiment 7 is an external-combustion, closed-cycle thermal engine according to any one of Embodiments 1 to 4 and 6, characterized in that the pistons provided in the multiple sealed gas chambers (multiple cylinders) have a shared crank chamber.

The invention according to Embodiment 8 is an external-combustion, closed-cycle thermal engine according to any one of Embodiments 1 to 4, 6 and 7, characterized in that flow paths that connect the inlet side and outlet side of the heater, respectively, and flow paths that connect the inlet side and outlet side of the cooler, respectively, are provided to a chamber A and a chamber B created by dividing the gas chamber by the piston.

The invention according to Embodiment 9 is an external-combustion, closed-cycle thermal engine according to any one of Embodiments 1 to 3, 5 and 6, characterized in that flow paths that connect the inlet side and outlet side of the heater and flow paths that connect the inlet side and outlet side of the cooler are provided to each chamber created by dividing the gas chamber by one or multiple reciprocal flow turbines, respectively.

Effects of the Invention

With the external-combustion, closed-cycle thermal engine proposed by the present invention, the cooler is sealed by the on-off valves and therefore working gas in the cooler is not compressed and remains at low temperature and low pressure when the gas chamber is heated, while the heater is sealed by the on-off valves and therefore working gas in the heater is not decompressed and remains at high temperature and high pressure when the gas chamber is cooled, and temperature/pressure changes only occur in the working gas in the gas chamber, and accordingly, unlike the conventional Stirling engine, no wasteful energy is consumed to compress or decompress the working gas in the heater and cooler, regardless of the sizes of the heater and cooler. This improves the heating and cooling efficiencies and achieves a higher engine efficiency than the conventional Stirling engine. Also, temperature/pressure in the gas chamber can be rapidly changed by switching the on-off valves, to increase the engine output.

When the gas chamber is heated, the cooler is sealed by the on-off valves and therefore working gas in the cooler can be cooled continuously in an effective manner, and when the gas chamber is cooled, the heater is sealed by the on-off valves and therefore working gas in the heater can be heated continuously in an effective manner, which allows both the heater and cooler to operate effectively during the entire period and also increases the utilization efficiencies of the heat source and cold heat source.

As explained above, since the volumes of the heater and cooler including flow paths no longer affect efficiency, the flow paths between the heater/cooler and engine can be made longer, allowing the heater and cooler to be installed away from the engine, which in turn ensures flexibility of equipment layout as well as effective utilization of existing waste heat sources, etc., at positions where the engine is difficult to install.

In addition, the heater and cooler can be increased in size to provide a larger heat conduction area, thereby ensuring a sufficient amount of heat to be conducted even at a small temperature difference, which in turn allows for effective utilization of low-temperature heat sources such as waste heat, and also makes the design conditions for the heater less strict so that the best material, structure, workings, etc., can be selected for the heater according to the purpose.

Rare helium need not be used for the working gas, and the working gas can be nitrogen, air, etc. Also, use of carbon dioxide, xenon or other gas of high specific gravity allows the reciprocal flow turbine to be made smaller.

In addition, no displacer is used, which means that heat-insulation material can be provided in the gas chamber and consequently the amount of heat dissipation through the exterior of the gas chamber can be reduced to improve thermal efficiency, while the ability to keep the exterior of the gas chamber at low temperature eliminates the need to use expensive heat-resistant alloys.

By using three-way on-off valves and providing them on the inlet side and outlet side of the heater and cooler, respectively, the number of flow paths to the gas chamber can be reduced from four to two to simplify the structure.

Furthermore, using check valves that automatically actuate upon pressure change for the on-off valves on the inlet side of the heater and outlet side of the cooler eliminates the need for human operation and simplifies the control operation.

According to the present invention, an external-combustion, closed-cycle thermal engine whose operation body is a piston or reciprocal flow turbine can be provided.

Also with the present invention, the working gas in the heater remains at high temperature and high pressure, while the working gas in the cooler remains at low temperature and low pressure, throughout the entire cycle, and therefore if multiple sealed gas chambers and operation bodies are provided to achieve a multi-cylinder configuration, one large heater and one large cooler can be provided and shared by the multiple cylinders. Accordingly, the heater/cooler structure can be significantly simplified compared to the conventional multi-cylinder Stirling engine that requires one heater and one cooler for each cylinder.

If the present invention is applied as a multi-cylinder external-combustion, closed-cycle thermal engine having multiple sealed gas chambers and using pistons as operation bodies, one crank chamber can be shared and each cylinder piston can be actuated at an equal phase difference of 360° in total, so as to keep the total volume and pressure of the shared crank chamber and spaces below the pistons in the cylinder chambers constant, thereby preventing change in the force applied to the back of each piston and ensuring smooth piston operation.

The star, horizontal opposing, and V layouts are supported, among others.

Flow paths are provided that connect the inlet side and outlet side of the heater, respectively, and inlet side and outlet side of the cooler, respectively, to a chamber A and a chamber B created by dividing the cylinder by the piston, so that chamber B becomes low in temperature and low in pressure when chamber A is set to high temperature and high pressure through operations of the on-off valves, while chamber B becomes high in temperature and high in pressure when chamber A is set to low temperature and low pressure, thereby allowing a greater pressure difference to be applied to the piston and ensuring high output with a small engine.

By providing flow paths that connect the inlet side and outlet side of the heater and inlet side and outlet side of the cooler, to each chamber created by dividing the cylinder by one or multiple reciprocal flow turbines, respectively, and allowing the adjacent chambers to have the opposite processes of heating and cooling through operations of the on-off valves, as the number of reciprocal flow turbines increases, a greater pressure difference can be applied to each reciprocal flow turbine, thereby ensuring high output with a small engine.

DESCRIPTION OF THE SYMBOLS

Figure 1:
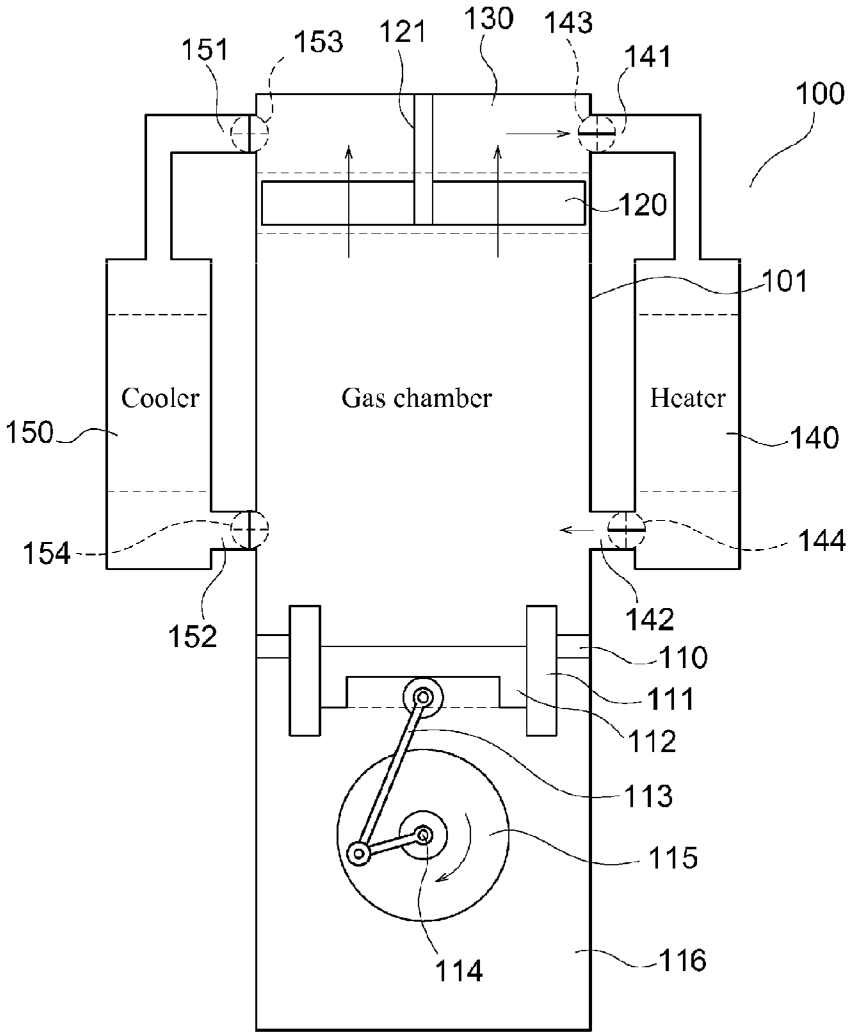
FIG. 1 A schematic section view illustrating an example of an external-combustion, closed-cycle thermal engine conforming to the present invention FIG. 2 A schematic section view illustrating another example of an external-combustion, closed-cycle thermal engine conforming to the present invention FIG. 3 A section view of key parts illustrating another example of an external-combustion, closed-cycle thermal engine conforming to the present invention FIG. 4 A schematic section view illustrating another example of an external-combustion, closed-cycle thermal engine conforming to the present invention FIG. 5 A schematic plan view illustrating another example of an external-combustion, closed-cycle thermal engine conforming to the present invention FIG. 6 A schematic section view of multiple gas chambers (1) to (4) arranged as shown in FIG. 5

100 External-combustion, closed-cycle thermal engine
101 Gas chamber
110 Bulkhead
111 Cylinder
112 Power piston
113 Crank
114 Rotational shaft
115 Flywheel
116 Crank chamber
120 Fan
121 Drive shaft
130 Chamber
140 Heater
141 Flow path on hot-gas inlet side
142 Flow path on hot-gas outlet side
143, 144, 153, 154 On-off valve
145, 155 Check valve
150 Cooler
151 Flow path on cool-gas inlet side
152 Flow path on cool-gas outlet side
200 External-combustion, closed-cycle thermal engine
210 Reciprocal flow turbine
211 Drive shaft
212 Pressure-resistant through section
220 Generator
300 External-combustion, closed-cycle thermal engine
310 Opening
311 Flow path
320, 321 Three-way valve
330 Opening
331 Flow path
400 External-combustion, closed-cycle thermal engine
410, 420 Heater header
430, 440 Cooler header
450, 460 Fan
421, 461 Flow path
470 Crank chamber
500 External-combustion, closed-cycle thermal engine
600 External-combustion, closed-cycle thermal engine

MODES FOR CARRYING OUT THE INVENTION

Specific modes for carrying out the present invention are explained in detail by referring to the drawings.

FIG. 1 is a schematic section view illustrating an example of an external-combustion, closed-cycle thermal engine 100 conforming to the present invention.

In this figure, a bulkhead 110 and a cylinder 111 are provided below a gas chamber 101, and a piston 112 is provided on the inside of the cylinder 111. Reference numeral 113 represents a crank, 114 represents a rotational shaft, and 115 represents a flywheel. The crank 113, rotational shaft 114 and flywheel 115 are stored in a sealed crank chamber 116. These components are conventionally known and therefore not explained in details. A fan 120 is provided at the top edge of the gas chamber 101, and a chamber 130 is formed downstream of the fan 120. A motor (not illustrated) that drives the fan 120 is provided at the upper part of the gas chamber 101, and the fan 120 is secured to a drive shaft 121. Reference numeral 140 represents a heater whose one end is connected to the chamber 130 via a flow path on hot-gas inlet side 141 and whose other end is connected to the lower part of the gas chamber via a flow path on hot-gas outlet side 142. Reference numeral 150 represents a cooler whose one end is connected to the chamber 130 via a flow path on cool-gas inlet side 151 and whose other end is connected to the lower part of the gas chamber 101 via a flow path on cool-gas outlet side 152. Reference numeral 143 represents an on-off valve provided in the flow path on hot-gas inlet side 141, 144 represents an on-off valve provided in the flow path on hot-gas outlet side 142, 153 represents an on-off valve provided in the flow path on cool-gas inlet side 151, and 154 represents an on-off valve provided in the flow path on cool-gas outlet side 152.

The positions of on-off valves 143, 144, 153, 154 indicated by solid lines in FIG. 1 are positions in the heating process, while the positions indicated by broken lines are those in the cooling process.

The operation of the above is as follows. First, the fan 120 causes the working gas such as nitrogen gas in the gas chamber to flow in the direction of the arrow into the chamber 130, and because the on-off valves 143, 144 are open and on-off valves 153, 154 are closed, the flow of working gas enters the flow path on hot-gas inlet side 141, passes the heater 140, and flows into the lower part of the gas chamber from the flow path on hot-gas outlet side 142, as shown by the arrows, as a result of which the working gas in the gas chamber is heated and becomes high in temperature and pressure and expands, to push down the piston 112 and turn the rotational shaft 114 via the crank 113. When the gas chamber is in the heating process, the on-off valves 153, 154 remain closed and working gas in the cooler 150 continues to be cooled. Next, the on-off valve 144 in the flow path on hot-gas outlet side 142 and on-off valve 143 in the flow path on hot-gas inlet side 141 are controlled to the closed positions indicated by broken lines, while the on-off valve 154 in the flow path on cool-gas outlet side 152 and on-off valve 153 in the flow path on cool-gas inlet side 151 are controlled to the open positions indicated by broken lines, to cause the high-temperature, high-pressure working gas in the gas chamber to flow into the cooler 150, upon which the pressure in the gas chamber drops rapidly. When the pressure in the cooler 150 becomes roughly equivalent to the pressure in the gas chamber, the working gas circulates from the gas chamber to the fan 120, to the flow path on cool-gas inlet side 151, to the cooler 150, to the flow path on cool-gas outlet side 152, and to the gas chamber, and as the working gas in the gas chamber is cooled and decompressed and contracts, the piston 112 is pushed up by the pressure of the gas in the crank chamber 116 (since the gas chamber is charged with high pressure, this pressure is much higher than the atmospheric pressure even in the cooling period), and the rotational shaft 114 turns via the crank 113. When this gas chamber is in the cooling process, the on-off valves 143, 144 remain closed and working gas in the heater 140 continues to be heated. When the heating process starts at the gas chamber, therefore, the low temperature and low pressure in the gas chamber that has just completed the cooling process can be raised rapidly by switching the on-off valves 143, 144, 153, 154. Through repeated switchings of the on-off valves 143, 144, 153, 154 between the open position and closed position as described above, the working gas in the gas chamber is heated/cooled and compressed/decompressed repeatedly.

While the heater and cooler of the conventional Stirling engine operate only during partial periods, the aforementioned heater 140 and cooler 150 operate effectively over the entire period to improve performance as described above. Also, the amount of heat required for heating, and amount of cold heat required for cooling are effectively utilized throughout the entire period without any part of the heat or cold heat being wasted as is the case with the conventional Stirling engine, which improves the thermal efficiency of the system.

Figure 2:
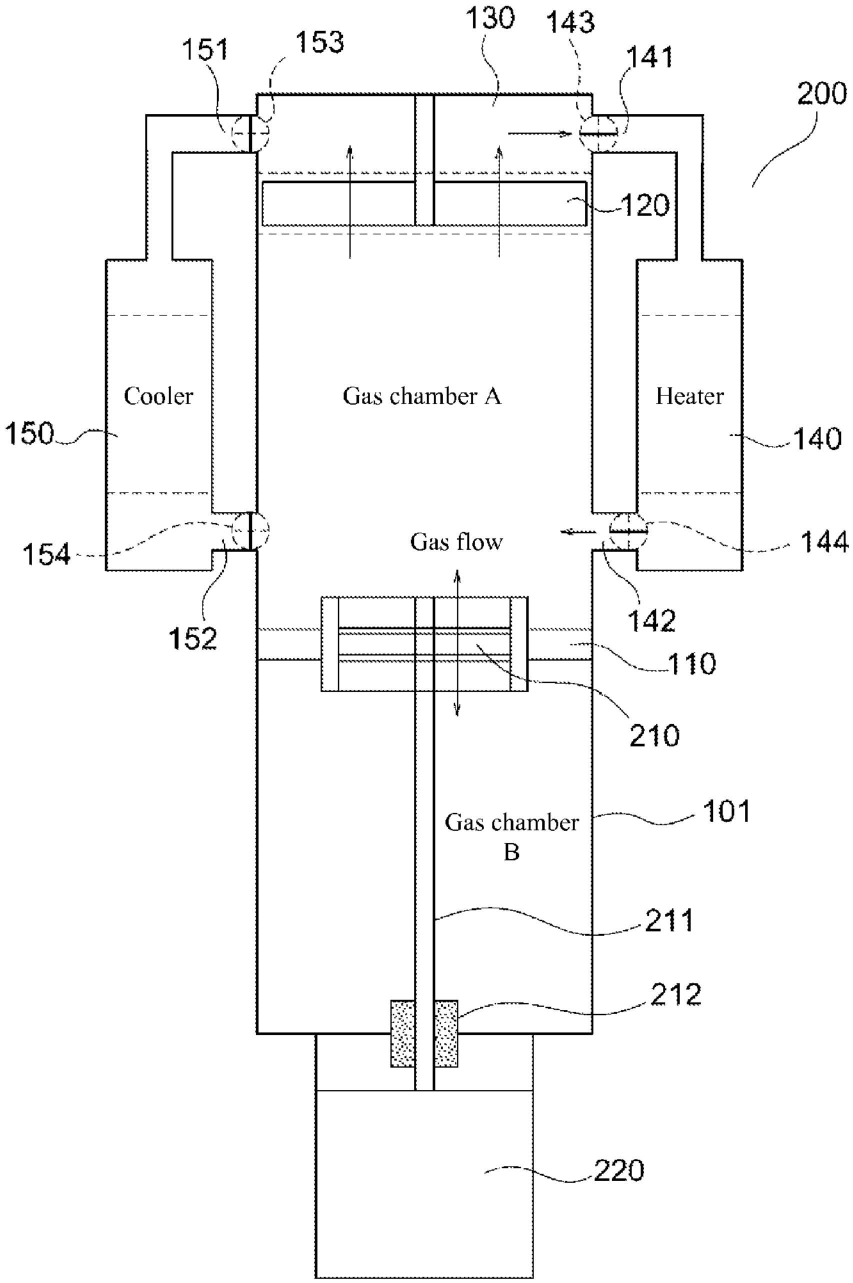

FIG. 2 is a schematic section view illustrating another example of an external-combustion, closed-cycle thermal engine 200 conforming to the present invention.

In this figure, the components common to those in FIG. 1 are assigned the same reference numerals and not explained. The air chamber 101 has a reciprocal flow turbine 210 on its bulkhead 110 and is divided into a gas chamber A and a gas chamber B. The reciprocal flow turbine 210 has a drive shaft 211, which penetrates through a pressure-resistant through-section 212 provided in the bottom wall of the gas chamber 101 and connects to a motor 220 externally provided to the bottom of the gas chamber 101.

The operation of the above is roughly the same as that illustrated in FIG. 1, so only the differences are described. As the working gas in the heating process flows into the lower part of the gas chamber A, as shown by the arrow, the working gas in the gas chamber A is heated and becomes high in temperature and pressure and expands, and then passes the reciprocal flow turbine 210, flows into the gas chamber B and turns the reciprocal flow turbine 210, upon which the motor 220 is driven via the rotational shaft 211 to generate power. Next, the working gas in the cooling process flows to the lower part of the gas chamber A, and the high-temperature, high-pressure working gas in the gas chamber A flows into the cooler 150, upon which the pressure in the gas chamber A drops rapidly and the working gas in the gas chamber A contracts, and consequently the working gas in the gas chamber B flows back into the gas chamber A through the reciprocal flow turbine 210 to turn the reciprocal flow turbine 210 in the same direction as in the previous process and the motor 220 is driven via the rotational shaft 211 to generate power. While the motor 220 is operated to utilize drive power as electricity in the above, drive power can also be utilized directly as rotational torque. As shown in the figure, the direction of generated flow of working gas is reversed between the heating process and cooling process, but the reciprocal flow turbine 210 generates rotational torque in the same direction.

Figure 3:
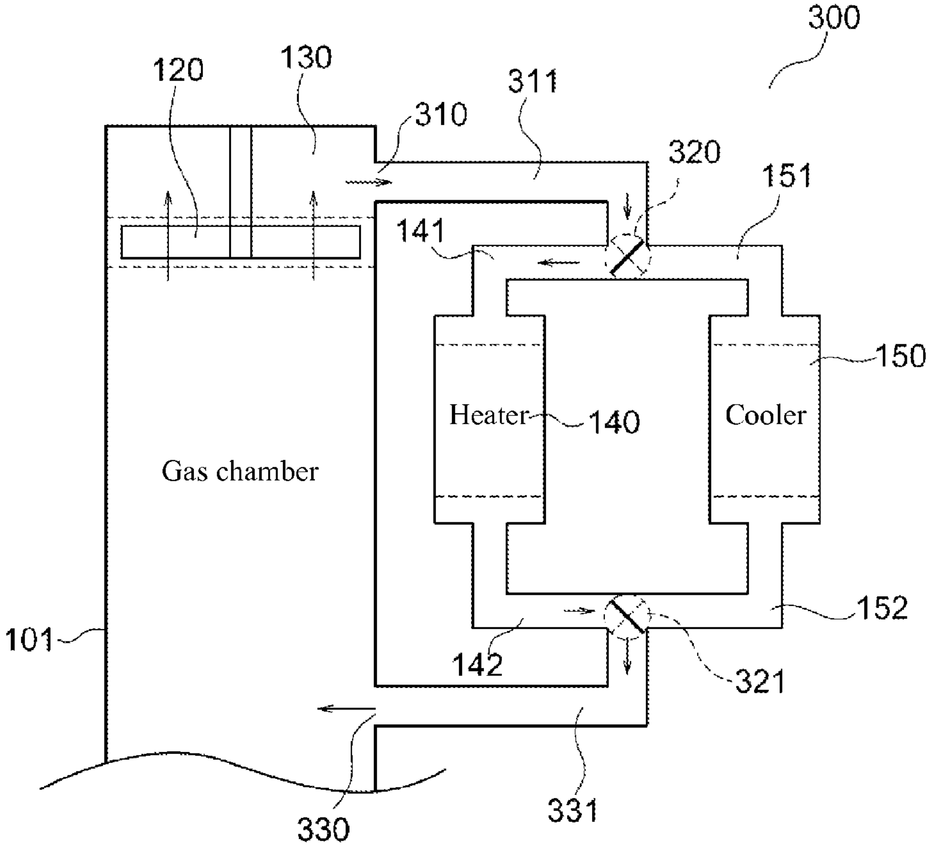

FIG. 3 is a section view of key parts illustrating another example of an external-combustion, closed-cycle thermal engine 300, other than the external-combustion, closed-cycle thermal engines 100 and 200, conforming to the present invention. The components common to those in FIGS. 1 and 2 are assigned the same reference numerals.

In this figure, the chamber 130 at the upper part of the gas chamber 101 has an opening 310 that connects to a flow path 311 and branches at a three-way valve 320 provided at the end of the flow path 311, to be selectively guided to the flow path on hot-gas inlet side 141 or flow path on cool-gas inlet side 151. The flow path on hot-gas outlet side 142 of the heater 140 or flow path on cool-gas outlet side 152 of the cooler 150 is selectively connected to a flow path 331 via a three-way valve 321, and the flow path 331 is connected to an opening 330 provided at the lower part of the gas chamber 101. The flow paths 311, 331 may be shortened or not provided at all, with the three-way valves 320, 321 provided at the openings 310, 330.

In the foregoing, the on-off valves 143, 153 as described in FIGS. 1 and 2 are consolidated into one three-way valve 320, while the on-off valves 144, 154 are consolidated into one three-way valve 321.

The three-way valves 320, 321 indicated by solid lines in FIG. 3 represent conditions in the heating process, while broken lines indicate conditions in the cooling process, and through repeated switchings, the working gas in the gas chamber is heated/cooled and compressed/decompressed repeatedly. This operation is the same as those in FIGS. 1 and 2 and therefore not described.

Figure 4:
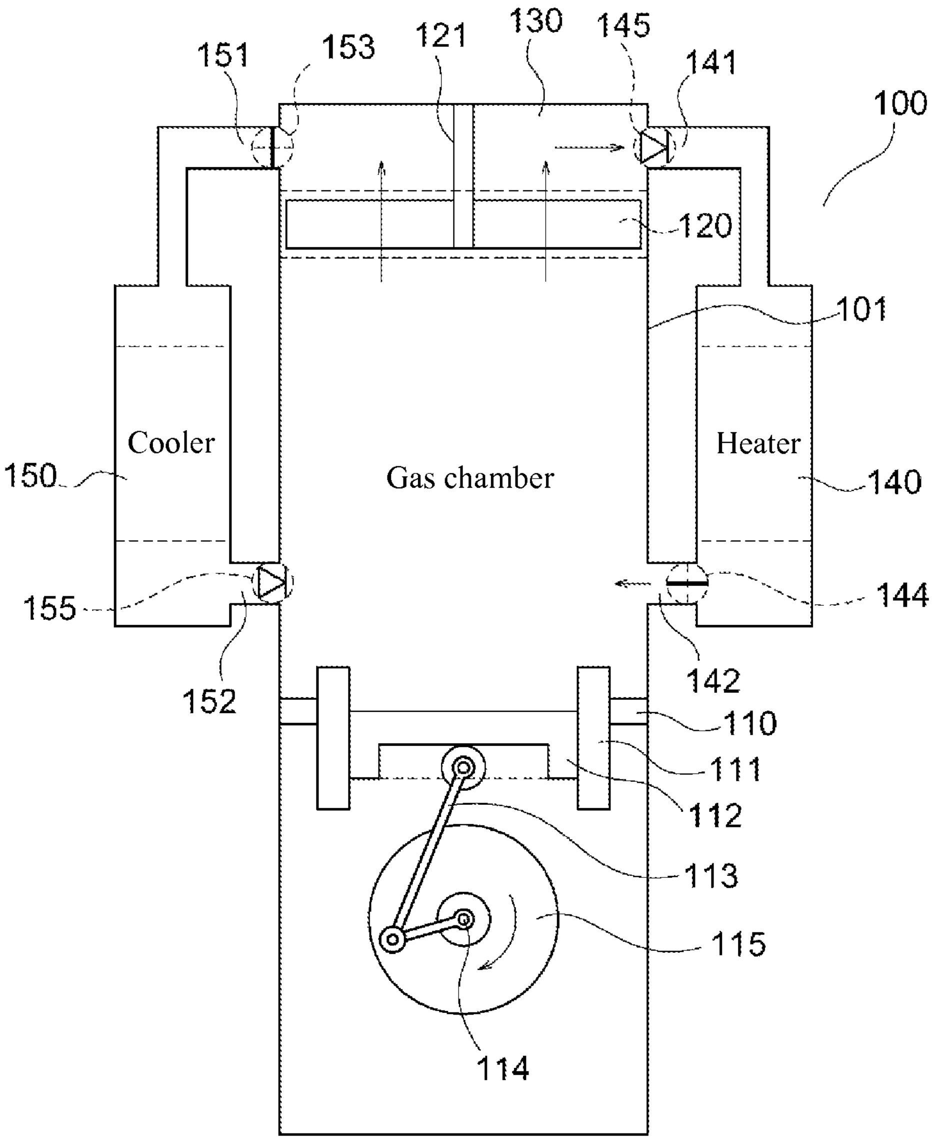

FIG. 4 is a schematic section view illustrating another example of an external-combustion, closed-cycle thermal engine 100 conforming to the present invention. In this figure, reference numerals 145 and 155 represent check valves, where the on-off valve 143 provided in the flow path on hot-gas inlet side 141 and on-off valve 154 provided in the flow path on cool-gas outlet side 152, as shown in FIGS. 1 and 2 illustrating examples, are provided as the check valves 145 and 155, respectively.

In the heating process, the check valve 145 opens automatically due to the pressure of the fan 120 when the pressure in the gas chamber becomes roughly equivalent to the pressure in the heater 140. At this time, since the gas chamber is charged with high pressure, the working gas does not enter the cooler 150 from the check valve 155 provided in the flow path on cool-gas outlet side 152. In the cooling process, the check valve 155 opens automatically due to the pressure of the fan 120 when the pressure in the gas chamber becomes roughly equivalent to the pressure in the cooler 150. At this time, since the gas chamber is charged with low pressure, the working gas does not enter the heater 140 from the check valve 145 provided in the flow path on hot-gas inlet side 141.

The above structure simplifies the control and structure of the external-combustion, closed-cycle thermal engine.

Figure 5:
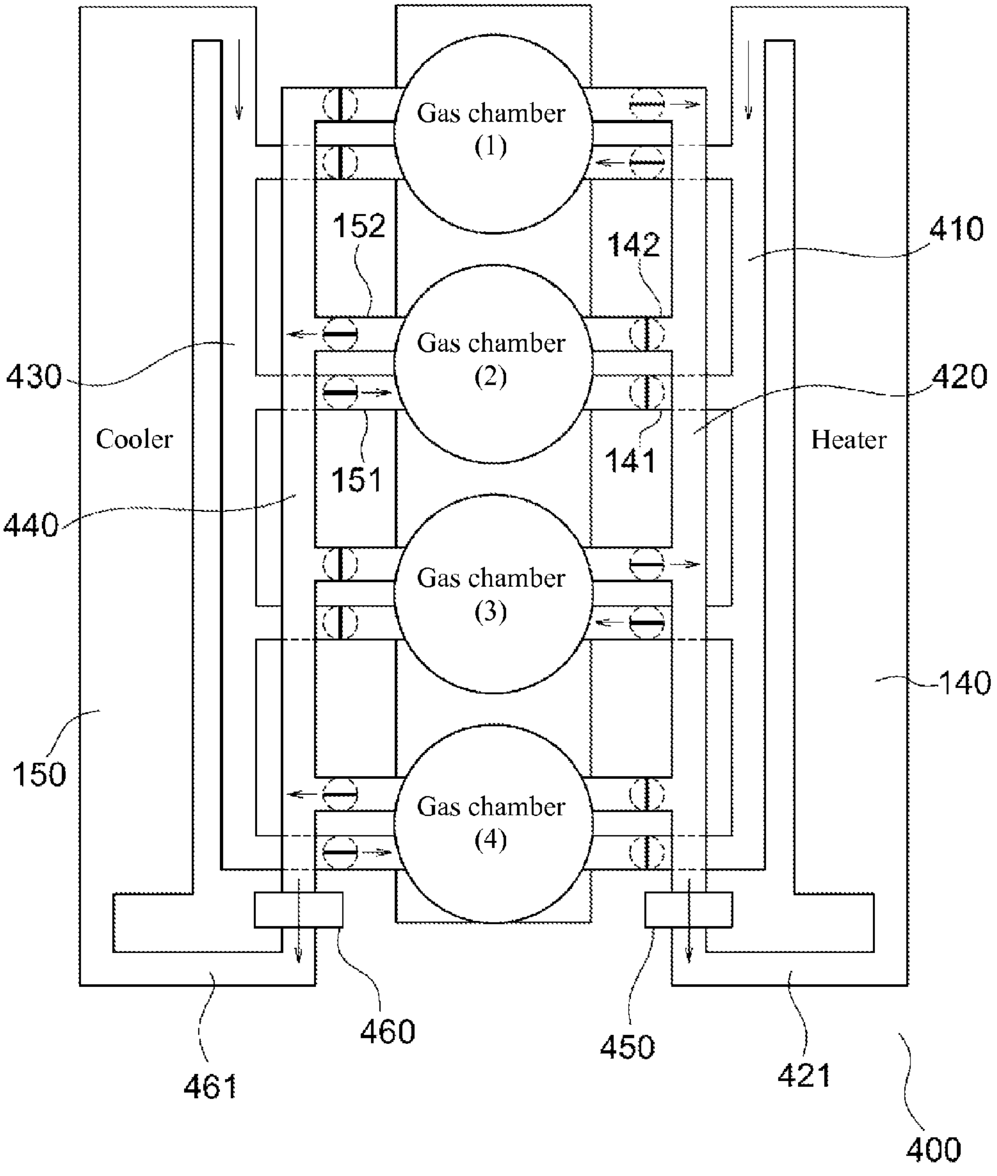

FIG. 5 is a schematic plan view illustrating another example of an external-combustion, closed-cycle thermal engine 400 conforming to the present invention.

In this figure, multiple gas chambers (1) to (4) are placed to achieve a multi-cylinder configuration, where the flow path on hot-gas inlet side 141 and flow path on hot-gas outlet side 142 connecting to each gas chamber (cylinder) share one heater 140, while the flow path on cool-gas inlet side 151 and flow path on cool-gas outlet side 152 connecting to each gas chamber share one cooler 150. Reference numeral 410 represents a heater header that branches the flow path on hot-gas inlet side 141 connecting to each gas chamber (cylinder), while 420 represents a heater header that aggregates the flow path on hot-gas outlet side 142 connecting to each gas chamber (cylinder). Reference numeral 430 represents a cooler header that branches the flow path on cool-gas inlet side 151 connecting to each gas chamber (cylinder), while 440 represents a cooler header that aggregates the flow path on cool-gas outlet side 152 connecting to each gas chamber (cylinder). Reference numeral 450 represents a fan provided in a flow path 421 between the heater 140 and heater header 420, while 460 represents a fan provided in a flow path 461 between the cooler 150 and cooler header 440.

The heater 140 is constantly kept at high temperature and high pressure, while the cooler 150 is constantly kept at low temperature and low pressure, and therefore the operation described in detail in FIG. 1 can be obtained by switching the on-off valves 143, 144, 153, 154 in such away to put half of the gas chambers (cylinders) in the cooling process and the remaining half of gas chambers (cylinders) in the heating process.

Figure 6:
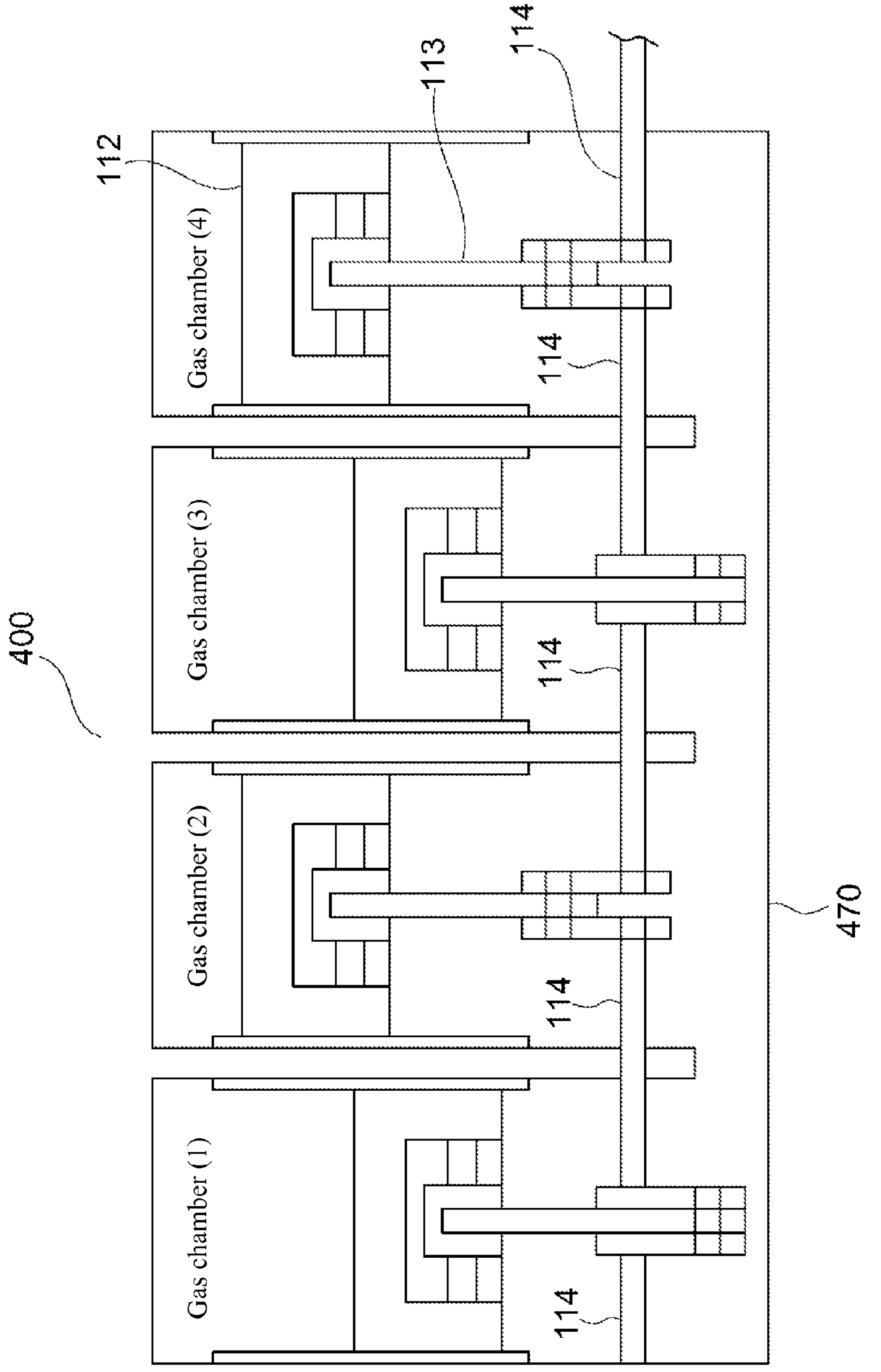

FIG. 6 is a section view of multiple gas chambers (1) to (4) placed in FIG. 5.

In this figure, the crank chambers 116 provided in the gas chambers (1) to (4) are interconnected to form one crank chamber 470. The rotational shafts 114 connecting to each crank 113 share a center shaft. As shown in this figure, the pistons 112 operate at an equal phase difference of 360° in total, to keep the space volume of the crank chamber 470, including the volume below the piston in each gas chamber (cylinder), constant.

Figure 7:
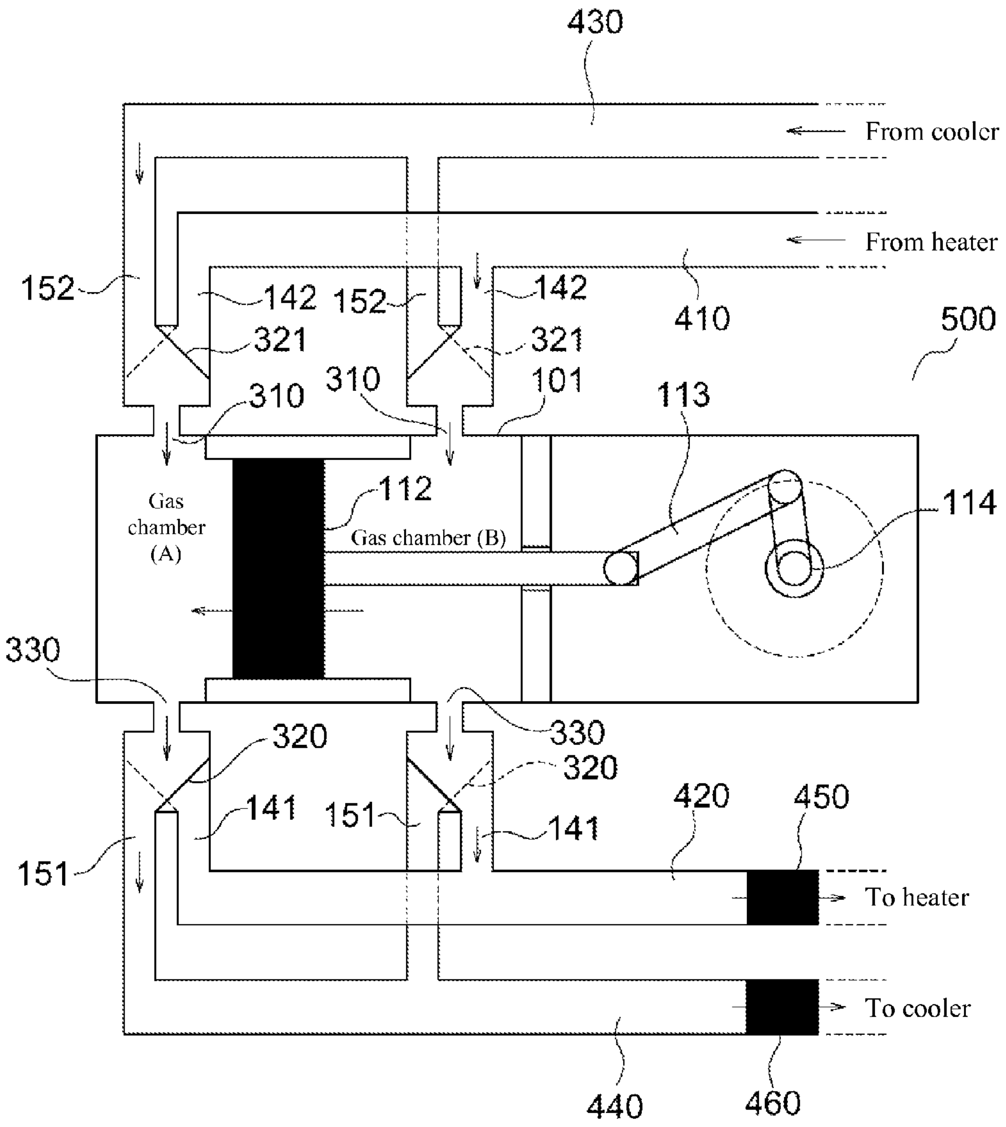
FIG. 7 A section view of key parts illustrating another example of an external-combustion, closed-cycle thermal engine conforming to the present invention FIG. 8 A section view of key parts illustrating another example of an external-combustion, closed-cycle thermal engine conforming to the present invention

FIG. 7 is a section view of key parts illustrating another example of an external-combustion, closed-cycle thermal engine 500 conforming to the present invention.

In this figure, the piston 112 divides the gas chamber 101 into gas chamber A and gas chamber B, and openings 310, 330 are provided in each gas chamber which connect, via three-way valves 320, 321, to the flow path on hot-gas inlet side 141, flow path on hot-gas outlet side 142, flow path on cool-gas inlet side 151 and flow path on cool-gas outlet side 152, and then to the heater headers 410, 420 and cooler headers 430, 440, to constitute the closed-cycle circuit of working gas that connects to the heater 140 and cooler 150. A fan 450 is provided at the end of the heater header 420 to constantly circulate high-temperature, high-pressure working gas, while a fan 460 is provided at the end of the cooler header 440 to constantly circulate low-temperature, low-pressure working gas.

The three-way valves 321, 320 indicated by solid lines in FIG. 7 cause the piston 112 between gas chamber A and gas chamber B to move in the direction of the arrow, because gas chamber A is in the cooling process and gas chamber B is in the heating process, and accordingly the gas in gas chamber A contracts and the gas in gas chamber B expands, and when the three-way valves 321, 320 are switched to the positions indicated by broken lines, the piston moves in the direction opposite the arrow to turn the rotational shaft 114, via the crank 113 connected to the piston 112, to obtain high-output drive power.

Figure 8:
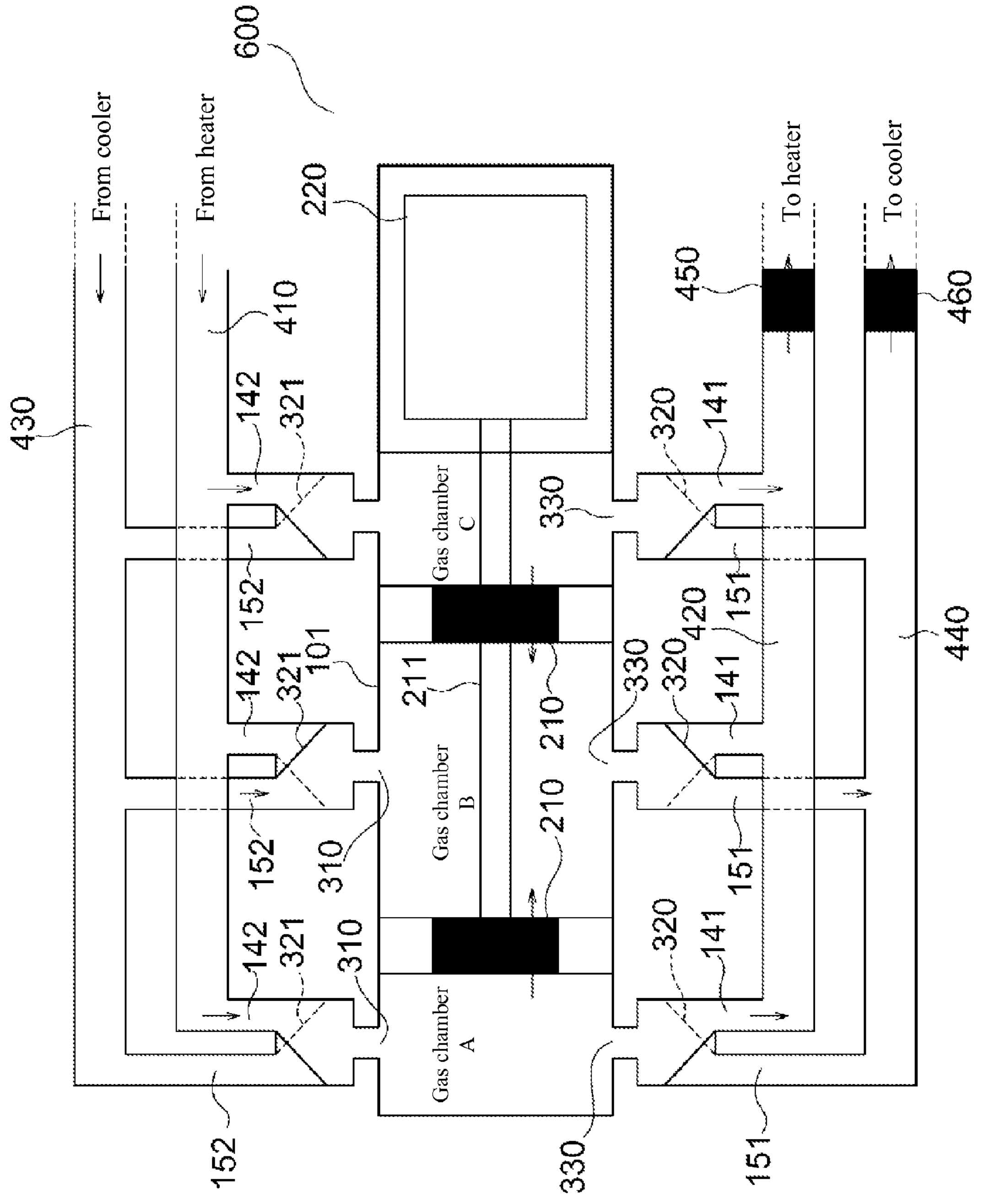

FIG. 8 is a section view of key parts illustrating another example of an external-combustion, closed-cycle thermal engine 600 conforming to the present invention. In this figure, the gas chamber 101 is divided by one or multiple reciprocal flow turbines 210 and, in the figure, gas chambers A, B and C are provided to constitute the same working gas flow paths explained in FIG. 7.

The three-way valves 321, 320 indicated by solid lines in FIG. 8 cause the reciprocal flow turbines 210 provided between the gas chambers to move in the directions of the arrows, because gas chambers A and C are in the heating process and gas chamber B is in the cooling process, and accordingly the gas in gas chambers A and C expand and the gas in gas chamber B contracts, and when the three-way valves 321, 320 are switched to the positions indicated by broken lines, the reciprocal flow turbines move in the directions opposite the arrows to act upon the reciprocal flow turbine 210 and turn the drive shaft 211, to obtain high-output drive force via the motor 220 connected to one end of the drive shaft 211. Since working gas flows into and out of gas chamber B from both gas chambers A and C, the gas chamber volumes are designed in such a way that the heating and cooling capacities of the heater and cooler with respect to gas chamber B become equal to the total heating and cooling capacities with respect to gas chambers A and C.

What is claimed is:

1. An external-combustion, closed-cycle thermal engine, comprising:

a sealed gas chamber, a heater and a cooler;

flow paths connecting the gas chamber and an inlet side and outlet side of the heater;

flow paths connecting the gas chamber and an inlet side and outlet side of the cooler;

on-off valves respectively provided in the flow paths on the inlet sides and outlet sides of the heater and cooler; and a means for moving a working gas;

said external-combustion, closed-cycle thermal engine characterized in that:

the on-off valves on the inlet side and outlet side of the cooler are closed to seal the cooler and the on-off valves on the inlet side and outlet side of the heater are opened to move and circulate the working gas in the gas chamber through the heater in order to heat the working gas in the gas chamber, or the on-off valves on the inlet side and outlet side of the heater are closed to seal the heater and the on-off valves on the inlet side and outlet side of the cooler are opened to move and circulate the working gas in the gas chamber through the cooler in order to cool the working gas in the gas chamber, thereby causing the working gas in the gas chamber to expand or contract to drive an operation body.

2. An external-combustion, closed-cycle thermal engine according to claim 1, characterized in that the on-off valves are three-way valves.

3. An external-combustion, closed-cycle thermal engine according to claim 1, characterized in that the on-off valves provided in the flow path connecting the gas chamber to the inlet side of the heater and the flow path connecting the outlet side of the cooler to the gas chamber, are check valves.

4. An external-combustion, closed-cycle thermal engine according to claim 3, characterized in that the operation body is a piston.

5. An external-combustion, closed-cycle thermal engine according to claim 3, characterized in that the operation body is a reciprocal flow turbine.

6. An external-combustion, closed-cycle thermal engine according to claim 5, characterized in that multiple sealed gas chambers and operation bodies are provided to share the heater and cooler.

7. An external-combustion, closed-cycle thermal engine according to claim 4, characterized in that the pistons provided in the multiple sealed gas chambers have a shared crank chamber.

8. An external-combustion, closed-cycle thermal engine according to claim 7, characterized in that flow paths that connect the inlet side and outlet side of the heater, respectively, and flow paths that connect the inlet side and outlet side of the cooler, respectively, are provided to a chamber A and a chamber B created by dividing the gas chamber by the piston.

9. An external-combustion, closed-cycle thermal engine according to claim 6, characterized in that flow paths that connect the inlet side and outlet side of the heater and flow paths that connect the inlet side and outlet side of the cooler are provided to each chamber created by dividing the gas chamber by one or multiple reciprocal flow turbines, respectively.

* * * * *